United States Patent [19]
Gordon et al.

[11] 3,865,902
[45] Feb. 11, 1975

[54] PROCESS FOR THE POLYMERIZATION OF MONO-OLEFINS

[75] Inventors: Wolfgang Gordon, Hofheim, Taunus; Kurt Rust, Frankfurt, Main; Erwin Schrott, Sulzbach, Taunus, all of Germany

[73] Assignee: Hoechst Aktiengesellschaft, Frankfurt/Main, Germany

[22] Filed: Apr. 10, 1973

[21] Appl. No.: 349,850

[30] Foreign Application Priority Data
Apr. 15, 1972 Germany............................ 2218363

[52] U.S. Cl. ........ 260/878 B, 260/88.2 R, 260/93.7, 260/94.9 C, 260/94.9 CA
[51] Int. Cl........... C08f 1/56, C08f 1/40, C08f 3/10
[58] Field of Search .. 260/94.9 C, 94.9 CA, 88.2 R, 260/93.7

[56] References Cited
UNITED STATES PATENTS

| | | | |
|---|---|---|---|
| 3,189,590 | 6/1965 | Coover et al. | 260/93.7 |
| 3,205,208 | 9/1965 | Coover et al. | 260/93.7 |
| 3,752,797 | 8/1973 | Gordon et al. | 260/94.9 C |

*Primary Examiner*—V. P. Hoke
*Attorney, Agent, or Firm*—Curtis, Morris & Safford

[57] ABSTRACT

The object of the invention is a process for the preparation of olefin polymers using a modified Ziegler catalyst. As modifications compounds are used which contain as the only functional groups one or two tertiary carboxylic acid amide groups or a urea grouping four times substituted at the nitrogen atoms. Polymers are obtained which confer special mechanical properties on the molded articles prepared therefrom.

6 Claims, No Drawings

PROCESS FOR THE POLYMERIZATION OF MONO-OLEFINS

The present invention relates to a process for the polymerisation of α-olefins.

It has been known for quite a long time that the stereo-specificity of the polymerisation of α-olefins in the presence of halogen-free, organo-aluminium, compounds and halogen compounds of the trivalent titanium, can be improved by adding stereo regulators, whereby the activity of the catalyst system decreases to a varying degree. Thus, for example, catalyst systems having carboxylic acid amides as stereo regulators are protected in U.S. Pat. No. 3,189,590.

With regard to the relation between stereospecificity and catalyst activity, the catalyst systems have proved especially favourable, which are described in Belgian Pat. Nos. 728,519 and 728,520, with cyclopolyalkenes having 7 or 8 ring members and having respectively 3 or 3 or 4 non-cumulated double bonds. It has now been possible to develop catalyst systems with further improved relation between catalyst activity and stereo-specificity.

The object of the invention is a process for the preparation of a crystalline polyolefin by polymerisation of at least one α-olefin of the formula $CH_2=CH-R$, wherein R represents an aliphatic radical having 1 to 4 carbon atoms, in suspension, in solution or in the gas phase, at a temperature of from 20° to 130°C and a pressure of from 1 to 50 kg/cm$^2$, wherein the polymerisation is carried out with a mixed catalyst, which is prepared from a. a halogen compound of the trivalent titanium (component A)
b. a halogen-free, organo-aluminium compound (component B)
c. a cyclopolyalkene having 7 or 8 ring members and having respectively from 2 to 3 or 2 to 4 non-cumulated double bonds in the ring and also the alkyl and alkoxy substituted derivatives, thereof wherein the alkyl radical contains from 1 to 4 carbon atoms (component C) and
d. a cyclic or non-cyclic compound which contains as the only functional groups one or two tertiary carboxylic acid amide groups or a urea grouping four times substituted at the nitrogen atoms (component D), The object of the invention is likewise a polymer of at least one α-olefin of the formula $CH_2=CH-R$, wherein R represents an aliphatic radical having from 1 to 4 carbon atoms, which is prepared by polymerising in suspension, in solution or in the gas phase at a temperature of from 20° to 130°C and a pressure of from 1 to 50 kg/cm$^2$ with the aid of a mixed catalyst, which is prepared from a. a halogen compound of the trivalent titanium (component A)
b. a halogen-free, organo-aluminium compound (component B)
c. a cyclopolyalkene having 7 or 8 ring members and having respectively from 2 to 3 or 2 to 4 non-cumulated double bonds in the ring as well as the alkyl- and alkoxy substituted derivatives, thereof wherein the alkyl radical contains from 1 to 4 carbon atoms (component C) and
d. a cyclic or non-cylic compound which contains as the only functional groups one or two tertiary carboxylic acid amide groups or a urea grouping four times substituted at the nitrogen atoms (component D).

As a halogen compound of the trivalent titanium (component A) preferably chlorine compounds are used in the process of the invention, which are prepared by the reduction of $TiCl_4$ by Al, $H_2$, Grignard compounds, or organo-aluminium compounds. Especially preferred are compounds of the approximate formula $TiCl_3.⅓ AlCl_3$, which can be prepared by reduction of $TiCl_4$ with Al or also by reacting $TiCl_3$ with $AlCl_3$ under grinding conditions. The component A can be used in a milled and in a non-milled form, according to the preparation process for the catalyst.

Especially suitable as halogen-free, organo-aluminium compound (component B) are branched or unbranched, unsubstituted aluminium alkyls, such as aluminium trimethyl, aluminium triethyl, aluminium triisobutyl, aluminium tridiisobutyl, aluminium diisobutyl hydride, and aluminium isoprenyl in the form described in the German Patent No. 1,183,084 or in the German Auslegeschrift 1,960,051. Aluminium triethyl is especially suitable. In the process of the invention, the molar ratio of the component B to the component A is between 0.5 : 1 and 15 : 1 preferably between 1.0 : 1 and 8 : 1. Suitable mixed catalyst components C are cycloheptatriene-(1, 3,5), norcaradiene and also their alkyl or alkoxy substituted derivatives wherein the alkyl radical contains from 1 to 4 carbon atoms, for example methyl-cycloheptatriene, dimethyl-cycloheptatrene or methoxy-cycloheptatriene.. Cyclooctatetraene, cyclooctatrienes and cyclooctadienes, their mixtures and their alkyl or alkoxysubstituted derivatives, wherein the alkyl or alkoxy radical contains from 1 to 4 carbon atoms, for example methyl-cyclooctatetraene, dimethylcyclooctatetraene, butoxycyclooctatetraene, cyclooctadiene-1,5) are likewise suitable as mixed catalyst component C. Cycloheptatriene, cyclooctatetraene and cyclooctadiene-(1,5) are preferred. The best results are obtained with cycloheptatriene. The molar ratio of the component C to the component A is between 0.1 : 1 and 2 : 1, preferably between 0.2 : 1 and 1 : 1.

Cyclic compounds with one or two tertiary amide functions in the ring or with a urea grouping fully substituted at the nitrogen, are suitable as catalyst component D, for example N-methylpyrrolidone, N-benzylvalerolactone, N-ethylcaprolactame, sarcosine anhydride, N,N-dibenzyldiketopiperazine.

Also suitable are similar aliphatic or aromatic compounds with the same functions outside a ring, whereby the nitrogen substituents can combine to form a ring, for example N,N-dimethyl formamide, N,N-dibutyl formamide, N,N-dimethyl acetamide, N,N-diethyl acetamide, N-acetylpyrrolidine, N-acetylmorpholine, N,N-dibenzoylpiperazine, N-methylformanilide, N-ethylacetanilide, N-ethyl-2-acetaminotoluene, N-methylformyl-xylidinide, N-methylbenzanilide, N-acetyldiphenylamine, tetramethylurea. N,N-dimethyl- and N,N-diethyl acetamide, N-methylformanilide, N-ethylacetanilide, sarcosineanhydride and tetramethyl urea are especially preferred, the best results being obtained with N,N-dimethyl and N,N-diethylacetamide and sarcosine anhydride. The molar ratio of the component D to the component A is between 0,1 : 1 and 3 : 1, preferably between 0.3 : 1 and 1.5 : 1.

The catalyst components can be used in pure form, in dissolved or in suspended form, whereby liquid, inert hydrocarbons are preferred solvents or suspension agents. They can also be mounted on carrier material which should consist preferably of the poly-α-olefin to be prepared. Components B, C and partly also D can be evaporated monomer the monomoer gas stream and led in gaseous form into the reactor. The mixture or reaction of the catalyst takes place either in the polymerisation vessel or in suitable form before adding the catalyst. Preferred forms of preparation of the catalyst combination of the components are a. preparation of a mixed solution of components B, C and D and mixing in the reactor with component A or b. grinding of component A in the presence of component C and/or D, optionally preparation of a mixed solution of component B with D and mixing of all the components in the reactor.

The addition of the catalyst components in the reactor is carried out in a way which ensures an even distribution in the reactor, i.e., when they are added at the same time, in separate places, if possible, and/or with successive addition at sufficient intervals so that the formation of inhomogenous product is substantially prevented. The quantities of the two catalyst components A and B used in carrying out the process of the invention are dependent on the monomer to be polymerized, the monomer partial pressure, the type of the components A and B and the type of the monomers and also on whether the polymerization is carried out in solution, in suspension, without pressure or under pressure or in the gas phase. Further the quantity depends to a considerable extent on the content of impurities of the monomers used which cannot be determined analytically. The catalyst concentration to be used decreases with increasing pressure, improving gas quality and rises with the number of the carbon atoms in the α-olefin. In general, the amount of catalyst component A is from 0.05 to 10 mmols per liter of dispersing agent in the suspension polymerization, preferably from 0.1 to 5 mmols per liter of dispensing agent. When polymerizing in the gas phase from 0.0005 to 1 mmol per liter of reactor volume are necessary, preferably from 0.005 to 0.5 mmol per liter of reactor volume. Using the gas phase process the catalyst quantity used is largely dependent on the reactor type used. For the process of the invention all types of agitator reactors, fluidization reactors and coil shaped reactors may be considered.

According to the process of the invention all α-olefins of the structure $CH_2=CH-R$, wherein $R=C_nH_{2n+1}$ and $n=1$ to 4 such as propylene, butene, 4-methylpentene can be polymerized. The advantages in the polymerization of propylene have proved especially great. Also with the polymerization of α-olefins with one another or with ethylene good results are obtained, the ethylene content being from 0.5 to 6 percent by weight, preferably from 1 to 4 percent by weight. Furthermore, the process for block polymerization, in which the monomers are introduced alternately into the polymerization vessel is suitable for polymerizing the above-mentioned α-olefins with one another or with ethylene, the content of ethylene units being from 5 to 35 percent by weight, preferably from 7 to 25 percent by weight. Copolymerizations and sequence polymerizations of propylene with ethylene can be carried out in these limits with especially good results Copolymerisation of propylene with up to 15 percent by weight butene is a further preferred embodiment of the invention.

The process of the invention can be carried out in the presence of a liquid, preferably of inert aliphatic hydrocarbons with a boiling range of from 60° to 180°C or liquefied α-olefins, wherein the crystalline poly-α-olefin precipitates. The gas phase process using scarcely any liquid diluent is especially advantageous since in this case the atactic portions are not separated and the advantages of the process are most evident.

The temperature range of the process of the invention is from 20° to 130°C. When polymerizing in suspension it is preferable to polymerize at from 40° to 80°C and when polymerizing in the gas phase the preferred temperature is from 70° to 110°C.

The pressure range of the process of the invention is from 1 to 50 kg/cm². If the polymerization is carried out in an inert diluent a pressure of from 1 to 15 kg/cm² is preferred. Using suspension polymerization in a liquified α-olefin and using gas phase polymerization a pressure of from 15 to 45 kg/cm² is preferred. A pressure of from 20 to 40 kg/cm² is especially preferred, whereby in the case of the block polymerization with ethylene the ethylene partial pressure can be lower.

All the variants of the process of the invention can be carried out continuously as well as discontinuously. The molecular weight is regulated preferably with hydrogen during the polymerization or adjusted after the polymerization by thermo-mechanical decomposition.

The advantage of the process of the invention is in the improvement of the relation between catalyst activity and stereospecificity. This means that in processes wherein either component C or component D is not used either a reduced catalyst activity is obtained with the same stereospecificity or a reduced stereospecifity with the same catalyst activity or both properties are not satisfactory according to how the quantitive proportions of the components C or D to A are chosen.

Therefore, according to the invention using the components A and B, which produce a high catalyst activity, poly-α-olefins can be produced with the aid of additional components C and D which have a smaller atactic portion than those obtained with only one of these additional components, even if quantities of component C or D are used, which are equal to the sum of the components C and D in the process of the invention. This leads to an improvement, for example, in the hardness, stiffness and elasticity modulus of molded bodies which are prepared from this material.

When the polymerization conditions are adjusted in such a way that the same stereospecificity is obtained in the process of the invention as in the process without the use of component C or D, either the space-time-yield or the catalyst yield or, in a slight measure, both can be increased, whereby the reactor size can be reduced and/or a product with lower ash content is obtained. Therefore, the advantages are especially pronounced with products from which the catalyst residues are not removed.

In the case of the copolymerization of α-olefins with one another or with ethylene the increased hardness of the products makes it possible to lower the crystallite melting point to a greater extent and in the case of the block polymerization of α-olefins with one another or with ethylene, the impact strength when cold can be improved in a broader range.

The process of the invention, therefore, provides polymers with advantageous mechanical properties.

The following Examples illustrate the invention. The $TiCl_3 \cdot \frac{1}{3} AlCl_3$ used in the examples and comparative experiments is characterized by the following specifications: $TiCl_4$-content 0.2 percent: extensively δ-modification, particle size 40 percent smaller than 44 μm, 35 percent between 44 and 74 μm, 25 percent between 74 and 177 μm.

EXAMPLE 1

1.0 kg of polypropylene with a reduced specific viscosity of 3.7 dl/g (0.1 percent in decahydronaphthalene, 135°C and 12.2 percent parts soluble in heptane 24-hour Soxhlet extraction) were placed in a horizontal 40 l. reactor with agitator scraping along the wall. The reactor was rinsed by introducing propylene several times under pressure and releasing the pressure, and heated to 95°C. A suspension of 2.95 g of $TiCl_3 \cdot \frac{1}{3} AlCl_3$ in 30 ml of heptane was added while stirring and with the exclusion of oxygen. After stirring for ten minutes a mixed solution was added consisting of 40 ml of heptane, 0.86 g of N,N-diethyl acetamide, 0.80 ml of cyclo-heptatriene-(1,3,5) and 10.3 ml of aluminium triethyl. The molar ratio of the mixed catalyst, Al-triethyl: cyclo-heptatriene: N,N-diethyl acetamide: $TiCl_3 \cdot \frac{1}{3} AlCl_3$ was 5 : 0.5 : 0.5 : 1. The components were mixed with the product in the reactor for 10 minutes. Subsequently 2.3 kg/h of propylene were introduced and at the same time, hydrogen to the extent that the $H_2$-concentration during the time of experiment was 0.55 volume percent. The inner temperature was 95°C during the experiment. The pressure rose quickly at the beginning, later slowly and reached 20 kg/cm² after 5 hours and 45 minutes. Subsequently, polymerization was continued for 1 hour and 15 minutes while adding a decreasing amount of gas and at constant pressure. Then the pressure was released and without further purification 15.1 kg of white polypropylene were obtained. After drawing off the initial polypropylene quantity the yield was 14.1 kg. The product had a reduced specific viscosity (0.1 percent in decahydronaphthalene, 135°C) of 3.4 dl/g and 10.7 percent was soluble in heptane (24 hours extraction time in the Soxhlet).

Comparative experiment A

Under the conditions of Example 1 a catalyst system of aluminium triethyl, cycloheptatriene-(1,3,5) and $TiCl_3 \cdot \frac{1}{3} AlCl_3$ in the proportion of 5 : 1 : 1 was used for the polymerization of propylene. The pressure reached 20 kg/cm² after 3 hours and 30 minutes. The total time of polymerization was again 7 hours. A net yield of 9.6 kg was obtained. The product had a reduced specific viscosity (0.1 percent in decahydrohaphthalene, 135°C) of 3.2 dl/g and 12.1 percent were soluble in heptane (24 hours extraction in the Soxhlet).

Comparative experiment B

Under conditions similar to those in Example 1, cycloheptatriene (1,3,5) was replaced by the same molar quantity of N,N-diethyl acetamide for comparison. In the polymerization the pressure reached 20 kg/cm² after 5 hours and 10 minutes. The total polymerization time was again 7 hours. A net yield of 13.6 kg was obtained. The product had a reduced specific viscosity (0.1 percent in decahydronaphthalene, 135°C) of 2.8 dl/g and 16.5 percent heptane soluble parts (24 hours extraction in the Soxhlet).

EXAMPLE 2

The reactor as used in Example 1 was charged with the exclusion of air with a mixture of 3.19 g of $TiCl_3 \cdot \frac{1}{3} AlCl_3$ with 50 g of polypropylene powder, which corresponded to the initial product of Example 1 and the whole was mixed for 10 minutes. Afterwards 0.85 ml of cycloheptatriene-(1,3,5), which was dissolved in 10 ml of heptane, were added dropwise while stirring. After a further 10 minutes a mixed solution of 8.8 ml of aluminium triethyl and 1.14 g of sarcosine anhydride in 40 ml of heptane were added in drops while stirring. After stirring for 10 minutes propylene and hydrogen were introduced into the reactor in the same way as in Example 1. The inner temperature was kept at 95°C during the whole duration of the experiment. The pressure rose within 6 hours and 50 minutes to 20 kg/cm². After a further 10 minutes at 20 kg/cm² the pressure was released and a net yield of 14.7 kg of white polypropylene was obtained. The product had a reduced specific viscosity (0.1 percent in decahydronaphthalene, 135°C) of 4.1 dl/g and contained 11.2 percent of heptane soluble parts (24 hours extraction in the Soxhlet).

EXAMPLE 3

Under the same conditions as in Example 1 a catalyst system of 72 mmols of aluminium triethyl, 18 mmols of $TiCl_3 \cdot \frac{1}{3} AlCl_3$, 12 mmols of tetramethyl-urea and 6 mmols of cyclooctatetraene-(1,3,5,7) was used. After 6 hours a pressure of 17.8 kg/cm² was reached. The pressure was released and subsequently at 90°C inner temperature 1.6 kg/h ethylene was introduced with a quantity of hydrogen such that the hydrogen concentration in the reactor was 6 percent. After 1.5 hours a pressure of 9.5 kg/cm² was reached. The pressure was released and 12.4 kg of block polymer were obtained, mixed with 1 kg of polypropylene. This experiment was repeated twice, whereby in each case 1 kg of the product employed in the previous experiment was used as initial product.

After the third experiment the block polymerisate contained only a minor part of homopolymer. It had a reduced specific viscosity of 4.8 dl/g (0.1 percent in decahydronaphthalene, 135°C). The ethylene part in the block polymer was 16.8 percent. Values for the ball indentation hardness of 410 kg/cm² were measured according to DIN 53,456 with 4 mm press plates, 1 kg preliminary load, 5 mm ball, 13.5 kg testing force, measurement after 30 seconds) and in the plate falling test at −30°C a falling height of 110 cm (falling hammer having a weight of 940 g and a ball diameter of 9 mm, 2 mm injection molded plate stored for a week at room temperature). Due to the good stereo-specificity the hardness of the product was still remarkable in spite of the good impact strength when cold.

EXAMPLE 4

With the exclusion of air and moisture 1 l. of a gasoline fraction (boiling point 140° to 165°C) were placed in a 2 l. vessel, provided with stirrer, thermometer and gas inlet tube, the vessel was rinsed with pure nitrogen and subsequently saturated at 55°C with propylene. Then 10 mmols of aluminium triethyl, 2 mmols of cycloheptatriene, 2 mmols of N-ethylacetanilide and 5 mmols of TiCl$_3$.⅓ AlCl$_3$ were added one after another. Polymerisation was carried out while constantly introducing propylene at first at 55°C. After 30 minutes the temperature was raised to 75°C and the polymerisation was carried out for a total of 5 hours. After the addition of 40 ml of isopropanol the mixture was stirred for 1 hour at 75°C and drawn off by suction while hot. After thorough washing with hot dispersion agent and acetone as well as drying in the vacuum at 70°C 215 g of polypropylene were obtained. The solid contained 2.7 percent of heptane soluble part and had a reduced specific viscosity of 7.2 dl/g (0.1 percent in decahydronaphthalene, 135°C). After concentration of the mother liquor in the vacuum a residue of 18 g of atactic polypropylene was obtained.

What is claimed is:

1. In a process for the preparation of a crystalline polyolefin by polymerization of at least one α-olefin of the formula CH$_2$=CH—R, wherein R represents an aliphatic radical having 1 to 4 carbon atoms, in suspension, in solution or in the gas phase, at a temperature of from 20° to 130°C. and a pressure of from 1 to 50 kg/cm$^2$, wherein the polymerization is carried out with a mixed catalyst, the improvement which comprises using a mixed catalyst prepared from
    a. a halogen compound of the trivalent titanium
    b. a halogen free, organo-aluminum compound
    c. a monocyclopolyalkene having 7 or 8 ring members and respectively 2 to 3 or 2 to 4 non-cumulated double bonds in the ring or the alkyl or alkoxy substituted derivatives thereof, the alkyl radical of the substituent containing from 1 to 4 carbon atoms and
    d. a cyclic or non-cyclic compound which contains as the only functional groups one or two tertiary carboxylic acid amid groups or a urea grouping fully substituted at the nitrogen atoms.

2. The process as claimed in claim 1, wherein the monomers are introduced at the same time into the polymerisation reaction mixture and from 0.5 to 6 percent by weight of ethylene is used additionally.

3. The process as claimed in claim 1, wherein the monomers are introduced alternately into the polymerisation reaction mixture and from 5 to 35 percent by weight of ethylene is used additionally.

4. A polymer of at least one α-olefin of the formula CH$_2$=CH—R, wherein R represents aliphatic radical having 1 to 4 carbon atoms, prepared by the process of claim 1.

5. A polymer according to claim 4 containing from 0.5 to 6 percent by weight of statistically distributed ethylene units.

6. A block polymer of at least one α-olefin of the formula CH$_2$=CH—R, wherein R represents an aliphatic radical having from 1 to 4 carbon atoms, said polymer containing from 5 to 35 percent by weight of ethylene units and being made by the process of claim 1.

* * * * *